United States Patent Office 3,282,977
Patented Nov. 1, 1966

3,282,977
2-METHOXY-3,6-DICHLOROTHIOBENZOIC ACID ESTERS
Eugene F. Barnas, Chicago, Ill., assignor to Velsicol Chemical Corporation, a corporation of Illinois
No Drawing. Filed Feb. 18, 1963, Ser. No. 259,440
6 Claims. (Cl. 260—455)

This invention relates to the production of new pesticidal compositions of matter. More specifically, this invention relates to new chemical compounds of the general formula

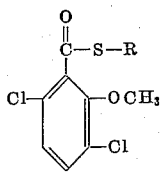

in which R is a hydrocarbon radical. These new compounds have been found to be useful as pesticides, particularly as herbicides for the control of undesirable plant life.

The new compounds can be prepared by the reaction of 2-methoxy-3,6-dichlorobenzoic acid with thiols RSH, wherein R is as defined above. Preferably, the compounds can be prepared by using the acid in the form of one of its acid halides such as 2-methoxy-3,6-dichlorobenzoyl chloride, or 2-methoxy-3,6-dichlorobenzoyl bromide. When an acid halide is used, however, it is also advantageous to have an acid scavenger such as sodium hydroxide, pyridine, sodium carbonate or potassium hydroxide present to take up the hydrogen halide which is formed during the reaction. Other catalysts and reaction promoters can be used as desired; acid catalysts such as hydrogen chloride, sulfuric acid, or arylsulfonic acids may be advantageous in catalytic amounts when 2-methoxy-3,6-dichlorobenzoic acid is contacted directly with thiols, for example.

Inert solvents such as benzene or toluene can be used to facilitate the reaction if desired. In many cases, the reaction will take place at room temperature; and for some of the more reactive thiols, it is desirable to cool the reaction mixture to prevent too vigorous a reaction. However, the reaction mixture can also be heated if desired to further the reaction, preferably at temperatures up to about the normal reflux temperature of the reaction mixture. With some reactatnts, the reaction may take place very quickly; but several hours or days may be necessary to carry out the reaction satisfactorily with less reactive starting materials. While the reaction is ordinarily carried out at atmospheric pressure, sub- or super-atmospheric pressures can also be used.

The reaction mixture can be worked up and the product isolated by any of the recognized techniques known to the art. When an acid scavenger has been used, the precipitate of a salt which may form can be filtered off, and the solvent can be removed by distillation. The residue can then be purified and the product isolated by fractional distillation, recrystallization from suitable solvents, chromatography, or other techniques known to the art. In many cases, such purification is not absolutely necessary, since the crude product will be very active pesticidally and can be used for pest control without further purification.

A wide variety of thiols RSH can be used to prepare the new compounds of this invention. Typical of these thiols are compounds such as methanethiol,
ethanethiol,
2-chloroethanethiol,
1-propanethiol,
2-chloropropanethiol,
3-chloropropanethiol,
2,3-dichloropropanethiol,
2-propanethiol,
1-chloro-2-propanethiol,
1-butanethiol,
3-chloro-1-butanethiol,
2-butanethiol,
1-pentanethiol,
2-pentanethiol,
1-hexanethiol,
6-chloro-1-hexanethiol,
2-hexanethiol,
1-decanethiol,
benzenethiol,
o-bromobenzenethiol,
o-chlorobenzenethiol,
p-chlorobenzenethiol,
m-chlorobenzenethiol,
2,4-dichlorobenzenethiol,
2,5-dichlorobenzenethiol,
3,4-dichlorobenzenethiol,
3,5-diethylbenzenethiol,
2,4-dimethoxybenzenethiol,
3,4-dimethoxybenzenethiol,
2,4-dinitrobenzenethiol,
p-ethoxybenzenethiol,
o-ethylbenzenethiol,
o-isopropylbenzenethiol,
m-methoxybenzenethiol,
o-methoxybenzenethiol,
p-methoxybenzenethiol,
m-nitrobenzenethiol,
p-nitrobenzenethiol,
pentachlorobenzenethiol,
2,3,5-trichlorobenzenethiol,
2,4,6-trichlorobenzenethiol,
m-toluenethiol,
5-chloro-m-toluenethiol,
o-toluenethiol,
4-chloro-o-toluenethiol,
p-toluenethiol,
3-methoxy-p-toluenethiol,
2-nitro-p-toluenethiol,
2-propene-1-thiol,
2-chloro-2-propene-1-thiol,
2-butene-1-thiol,
3-chloro-2-butene-1-thiol,
cyclohexanethiol,
2-chlorocyclohexanethiol,
2-cyclohexene-1-thiol,
3-cyclohexene-1-thiol,
cyclopentanethiol,
2-chlorocyclopentanethiol,
2-chloro-6-nitrobenzenethiol,
4-methoxy-3,5-dinitrobenzenethiol,
3-chloro-4-methoxybenzenethiol,
1-cyclopentenethiol,
2,6-dimethyl-6-octene-2-thiol,
and the like.

While useful compounds of this invention can be prepared wherein R is as defined above, preferred compounds of this invention are those in which R is selected from the group consisting of phenyl radicals and aliphatic radicals containing from one to ten carbon atoms. In a most preferred embodiment of this invention, R is selected from the group consisting of saturated unsubstituted aliphatic radicals containing from one to ten carbon atoms, unsaturated unsubstituted aliphatic radicals containing from three to ten carbon atoms, monochloro substituted and dichlorosubstituted saturated aliphatic radicals containing from three to ten carbon atoms, and radicals of the formula

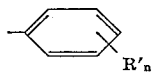

wherein R' is selected from the group consisting of lower unsubstituted alkyl, lower unsubstituted alkoxy, nitro, and halogen, and $n$ is a whole number from 0 to 5.

The manner in which typical compounds of this invention can be prepared is illustrated in the following examples, wherein all temperatures are in degrees centigrade.

EXAMPLE 1

*Preparation of 2-methoxy-3,6-dichlorobenzoyl chloride*

A mixture of 786 g. of finely powdered 2-methoxy-3,6-dichlorobenzoic acid and 1900 g. of thionyl chloride was stirred and refluxed for 2 hrs. in a 5-liter flask protected with a drying tube. Most of the excess thionyl chloride was removed under reduced pressure over a steam bath. The residue was distilled in vacuo to give 770 g. (90.5% yield) of 2-methoxy-3,6-dichlorobenzoyl chloride, B.P. 81–86°/0.2–0.3 mm.

EXAMPLE 2

*Preparation of S-octyl 2-methoxy-3,6-dichlorothiobenzoate*

A solution of 3.0 g. of NaOH in 30 ml. water was cooled by stirring it for about 5 min. with 40 g. of ice in a 250-ml. flask. n-Octyl mercaptan (7.3 g.; 0.05 mole) was added in one portion; and the mixture was stirred for 20 min. 2-methoxy-3,6-dichlorobenzoyl chloride (18 g.) was then added in portions during 15 min. The mixture was stirred for 1 hr. and 25 min., at the end of which time the temperature had risen at 26°. It was then extracted with ether; and the ether solution was washed first with 100 ml. of 10% sodium carbonate solution, then with water, and dried over magnesium sulfate. The dried solution was filtered and the ether was removed in vacuo to give a light yellow oil. The oil was distilled in vacuo, and a fraction (6.2 g.) boiling 109–143°/0.12–0.14 mm. was taken and redistilled. A total of 5.3 g. of S-octyl 2-methoxy-3,6 - dichlorothiobenzoate, B.P. 141–4°/0.12 mm., was obtained.

Analysis for $C_{16}H_{22}Cl_2O_2S$.—Theory, percent: C, 55.01; H, 6.30; Cl, 20.34; S, 9.17. Found, percent: C, 55.17; H, 6.46; Cl, 19.78; S, 9.86.

EXAMPLE 3

*Preparation of S-phenyl 2-methoxy-3,6-dichlorothiobenzoate*

2-methoxy-3,6-dichlorobenzoyl chloride (15.8 g.) and 100 ml. benzene were added to 7.3 g. of thiophenol in a 250-ml., round-bottomed flask. Pyridine (6.2 g.) was then added in one portion, whereupon a white precipitate separated. The mixture was stirred for 10 min., heated to reflux, and refluxed with stirring for 1 hr. After cooling, the solid was filtered off and washed with about 200 ml. of benzene. The combined benzene filtrate and washings were washed with 100 ml. of 5% NaOH, then with water, dried over magnesium sulfate, and filtered. Evaporation of the benzene on the steam bath gave a residue, which was triturated with cold heptane and filtered to yield 19.6 g. of tan crystals. The product was recrystallized from heptane to give 15.4 g. of S-phenyl 2-methoxy-3,6-dichlorothiobenzoate, off-white prisms, M.P. 101.5–104.5°.

A sample of product, M.P. 103–105°, from another similar run was analyzed.

Analysis for $C_{14}H_{10}Cl_2O_2S$.—Theory, percent: C, 53.67; H, 3.19; Cl, 22.68; S, 10.22. Found, percent: C, 53.93; H, 3.37; Cl, 22.69; S, 10.34.

A wide variety of other compounds within the scope of this invention can be prepared in a manner similar to that detailed above. In the following examples are given the reactants which can be used to give the indicated named compounds of this invention. For brevity, the compound 2-methoxy-3,6-dichlorobenzoyl chloride is designated as A.

EXAMPLE 4

Ethanethiol+A=S-Ethyl 2-methoxy-3,6-dichlorothiobenzoate.

EXAMPLE 5

2-chloroethanethiol+A=S - 2-Chloroethyl 2-methoxy-3,6-dichlorothiobenzoate.

EXAMPLE 6

1-decanethiol+A=S-Decyl 2-methoxy-3,6-dichlorothiobenzoate.

EXAMPLE 7

2-propene-1-thiol+A=S-Allyl 2-methoxy-3,6-dichlorothiobenzoate.

EXAMPLE 8

2,6-dimethyl-6-octene-2 - thiol+A=S-(2,6-dimethyl-6-octen-2-yl) 2-methoxy-3,6-dichlorothiobenzoate.

EXAMPLE 9

2-propanethiol+A=S-Isopropyl 2-methoxy-3,6-dichlorothiobenzoate.

EXAMPLE 10

3-chloro-2-butene-1 - thiol+A=S-(3-chloro-2-butenyl) 2-methoxy-3,6-dichlorothiobenzoate.

EXAMPLE 11

Cyclopentanethiol+A=S-Cyclopentyl 2 - methoxy-3,6-dichlorothiobenzoate.

EXAMPLE 12

2-cyclohexene - 1-thiol+A=S-2 - Cyclohexenyl 2-methoxy-3,6-dichlorothiobenzoate.

EXAMPLE 13 p - Chlorobenzenethiol+A=S-p - Chlorophenyl 2-methoxy-3,6-dichlorothiobenzoate.

EXAMPLE 14

2,5-dichlorobenzenthiol+A=S - (2,5-Dichlorophenyl) 2-methoxy-3,6-dichlorothiobenzoate.

EXAMPLE 15

3,5-diethylbenzenethio + A=S-(3,5-diethylphenyl) 2-methoxy-3,6-dichlorothiobenzoate.

EXAMPLE 16

2,4 - dimethoxybenzenethiol + A=S-(2,4-dimethoxyphenyl) 2-methoxy-3,6-dichlorothiobenzoate.

EXAMPLE 17

2,4-dinitrobenzenethiol + A=S-(2,4-dinitrophenyl) 2-methoxy-3,6-dichlorothiobenzoate.

EXAMPLE 18 p-Methoxybenzenethiol + A=S-p-methoxyphenyl 2-methoxy-3,6-dichlorothiobenzoate.

EXAMPLE 19 p-Nitrobenzenethiol + A=S-p-nitrophenyl 2-methoxy-3,6-dichlorothiobenzoate.

EXAMPLE 20

2,4,6 - trichlorobenzenethiol + A=S-(2,4,6-trichlorophenyl) 2-methoxy-3,6-dichlorothiobenzoate.

EXAMPLE 21 p-Toluenethiol + A=S-p-tolyl 2-methoxy-3,6-dichlorothiobenzoate.

EXAMPLE 22

4-chloro-o-toluenethiol + A=S-(4-chloro-o-tolyl) 2-methoxy-3,6-dichlorothiobenzoate.

EXAMPLE 23

3-methoxy-p-toluenethio + A=S-(3-methoxy-p-tolyl) 2-methoxy-3,6-dichlorothiobenzoate.

EXAMPLE 24

2-nitro-p-toluenethiol + A=S-(2-nitro-p-tolyl) 2-methoxy-3,6-dichlorothiobenzoate.

EXAMPLE 25

2-chloro-6-nitrobenzenethiol + A=S-(2-chloro-6-nitrophenyl) 2-methoxy-3,6-dichlorothiobenzoate.

EXAMPLE 26

4 - methoxy - 3,5-dinitrobenzenethiol + A=S-(4-methoxy-3,5-dinitrophenyl) 2-methoxy-3,6-dichlorothiobenzoate.

EXAMPLE 27

3 - chloro-4-methoxybenzenethiol + A=S-(3-chloro-4-methoxyphenyl) 2-methoxy-3,6-dichlorothiobenzoate.

EXAMPLE 28

Pentachlorobenzenethiol + A=S-pentachlorophenyl 2-methoxy-3,6-dichlorothiobenzoate.

For practical use as herbicides, the compounds of this invention are generally incorporated into herbicidal compositions which comprise an inert carrier and a herbicidally toxic amount of such a compound. Often these compositions will comprise a major amount of an inert carrier and a herbicidally toxic amount of a compound of this invention. Such herbicidal compositions, which can be called formulations, enable the active compound to be applied conveniently to the site of the weed infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid herbicidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the weed infestation. The emulsifiers most commonly used in these concentrates are nonionic or mixtures of nonionic with anionic surface-active agents.

A typical herbicidal composition according to this invention is illustrated by the following example, in which the quantities are in parts by weight.

EXAMPLE 29

*Preparation of a dust*

| | |
|---|---|
| Product of Example 2 | 10 |
| Powdered talc | 90 |

The above ingredients are mixed in a mechanical grinder-blender and are ground until a homogeneous, free-flowing dust of the desired particle size is obtained. This dust is suitable for direct application to the site of the weed infestation.

The herbicides of this invention can be applied in any manner recognized by the art. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, spreaders, adhesives, stickers, fertilizers, activators, synergists, and the like.

Weeds are undesirable plants in their growing where they are not wanted, having no economic value, and interfering with the production of cultivated crops or with the welfare of livestock. Many types of weeds are known, including annuals such as pigweed, lambsquarters, yellow foxtail, crabgrass, wild mustard, French-weed, rye-grass, goose-grass, chickweed, and smartweed; biennials such as wild carrot, great burdock, mullein, round-leaved mallow, blue thistle, bull thistle, houndstongue, moth mullein, and purple star thistle; or perennials such as white cockle, perennial rye-grass, quackgrass, Johnson grass, Canada thistle, hedge bindweed, Bermuda grass, sheep sorrel, field chickweed, and wintercress. Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively non-toxic to many beneficial plants. The method of this invention for the control of weeds comprises contacting said weeds with a herbicidal composition comprising an inert carrier and as the essential active ingredient, in a quantity which is herbicidally toxic to said weeds, a compound of this invention. The exact amount of compound required will depend on a variety of factors, including the hardiness of the particular weed species, weather, method of application, the kind of beneficial plants in the same area, and the like. Thus, while the application of up to only about one or two ounces of an active compound per acre may be sufficient for good control of a light infestation of weeds growing under adverse conditions, the application of one pound or more of active compound per acre may be required for good control of a dense infestation of hardy weeds growing under favorable conditions.

The herbicidal toxicity of the new compounds of this invention can be illustrated by many of the established testing techniques known to the art. For example, emulsifiable concentrate compositions can be diluted with water to concentrations equivalent to 4 pounds of the active compound per acre. Duplicate paper pots filled with a sand and soil mixture are seeded with weeds; and immediately after seeding, the soil surface of each pot is sprayed with an appropriately diluted test solution. The weed growth is maintained under artificial lighting with irrigation provided by placing the porous pots in a small amount of water in stainless steel trays. The weeds are subsequently observed for percent kill, injury, and stand reduction. The results indicate a high order of herbicidal activity of the compounds of this invention. Comparable pre-planting or post-emergence tests can also be used.

I claim:
1. A compound of the general formula

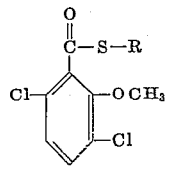

wherein R is selected from the group consisting of phenyl radicals and aliphatic radicals containing one to ten carbon atoms.
2. S-methyl 2-methoxy-3,6-dichlorothiobenzoate.
3. S-octyl 2-methoxy-3,6-dichlorothiobenzoate.
4. S-phenyl 2-methoxy-3,6-dichlorothiobenzoate.
5. S-isopropyl 2-methoxy-3,6-dichlorothiobenzoate.
6. S-allyl 2-methoxy-3,6-dichlorothiobenzoate.

References Cited by the Examiner
UNITED STATES PATENTS

| | | | |
|---|---|---|---|
| 2,173,827 | 9/1939 | Donleavy | 260—470 |
| 2,212,895 | 8/1940 | Allen | 260—455 |
| 2,259,869 | 10/1941 | Allen | 260—455 XR |
| 2,342,142 | 2/1944 | Harris et al. | 260—470 |
| 2,426,276 | 8/1947 | Meiser | 260—471 X |
| 2,445,142 | 7/1948 | Himel | 260—455 |
| 2,458,075 | 1/1949 | Himel | 260—455 |
| 2,854,325 | 9/1958 | Searle | 260—455 XR |
| 3,012,873 | 12/1961 | Richter | 71—2.6 |
| 3,035,910 | 5/1962 | Boyack et al. | 71—2.6 |

OTHER REFERENCES

Taboury: "Chemical Abstracts," 1908, volume 2, pp. 3330–3331.

CHARLES B. PARKER, *Primary Examiner.*

JULIUS S. LEVITT, *Examiner.*

JAMES O. THOMAS, JR., DALE R. MAHANAND,
*Assistant Examiners.*